United States Patent
Du et al.

(10) Patent No.: US 8,346,989 B2
(45) Date of Patent: Jan. 1, 2013

(54) DISPLAY APPARATUS AND CONTROL METHOD FOR ADJUSTING THE TIME REQUIRED FOR DETECTING INPUT SIGNALS

(75) Inventors: Hwa-jun Du, Anyang-si (KR); Young-chan Kim, Uiwang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 94 days.

(21) Appl. No.: 12/552,780

(22) Filed: Sep. 2, 2009

(65) Prior Publication Data

US 2010/0097385 A1    Apr. 22, 2010

(30) Foreign Application Priority Data

Oct. 22, 2008   (KR) .................. 10-2008-0103502

(51) Int. Cl.
*G06F 3/00* (2006.01)
*G06F 13/12* (2006.01)

(52) U.S. Cl. ................. 710/15; 710/19; 710/62

(58) Field of Classification Search .............. 710/15, 710/19, 62
See application file for complete search history.

(56) References Cited

U.S. PATENT DOCUMENTS

| | | | | |
|---|---|---|---|---|
| 5,572,263 A * | 11/1996 | Kim et al. | ............ | 348/705 |
| 5,781,250 A * | 7/1998 | Jun, II | ............ | 348/706 |
| 6,122,018 A * | 9/2000 | Sugihara et al. | ............ | 348/705 |
| 7,636,130 B2 * | 12/2009 | Chang | ............ | 348/706 |
| 2004/0105663 A1 * | 6/2004 | Kim et al. | ............ | 386/113 |
| 2010/0302220 A1 * | 12/2010 | Baek et al. | ............ | 345/204 |

\* cited by examiner

*Primary Examiner* — Chun-Kuan Lee
*Assistant Examiner* — David Martinez
(74) *Attorney, Agent, or Firm* — Sughrue Mion, PLLC

(57) ABSTRACT

A display apparatus capable of adjusting the time for detecting input signals from an external input source is provided. The display apparatus includes a signal detector which checks a plurality of input sources in sequence for a predetermined basic time and detects signals input from the plurality of input sources, and a controller which controls the signal detector to adjust the basic time and recheck the plurality of input sources if no signal is detected within the basic time. Accordingly, it is possible to recognize an input source from which input signals are detected late.

20 Claims, 6 Drawing Sheets

FIG. 4A

|  | INPUT SOURCE 1 | INPUT SOURCE 2 | INPUT SOURCE 3 |
|---|---|---|---|
| BASIC TIME | 3s | 3s | 3s |
| MAXIMUM ALLOWABLE TIME | 10s | 10s | 10s |
| MAXIMUM NECESSARY TIME | x | 6s | 2s |

FIG. 4B

| Number of Times | Type of Input Source | Checking Time | Presence/Absence of Detected Signal and Detecting Time | Reference Time |
|---|---|---|---|---|
| 1 | Input Source 1 | 3s | x | |
| 2 | Input Source 2 | 3s | x | |
| 3 | Input Source 3 | 3s | x | |
| 4 | Input Source 1 | 3s | x | |
| 5 | Input Source 2 | 3s | x | |
| 6 | Input Source 3 | 3s | x | |
| 7 | Input Source 1 | 3s | x | |
| 8 | Input Source 2 | 3s | x | |
| 9 | Input Source 3 | 3s | x | |
| 10 | Input Source 1 | 10s | x | 3s |
| 11 | Input Source 2 | 10s | 6s | 6s |
| 12 | Input Source 3 | 10s | 2s | 3s |

DISPLAY APPARATUS AND CONTROL METHOD FOR ADJUSTING THE TIME REQUIRED FOR DETECTING INPUT SIGNALS

CROSS-REFERENCE TO RELATED APPLICATIONS

This application claims priority from Korean Patent Application No. 10-2008-103502, filed on Oct. 22, 2008, in the Korean Intellectual Property Office, the disclosure of which is incorporated herein by reference in its entirety.

BACKGROUND OF THE INVENTION

1. Field of the Invention

Apparatuses and methods consistent with the present invention relate to a display apparatus and a control method thereof, and more particularly, to a display apparatus which is capable of adjusting the time required for detecting input signals from an external input source, and a control method thereof.

2. Description of the Related Art

A display apparatus having a television function generally receives various external signals from an external device besides terrestrial broadcasting. Such an external device, which is connected to an input terminal of the display apparatus and supplies it with external signals, includes a video-cassette recorder (VCR), a digital versatile disk (DVD) player, a satellite broadcast receiver, a personal computer (PC), and a game console.

However, in the process of reproducing the external signals, the display apparatus may fail to receive the external signals due to environmental factors or poor conditions in connection with the external device. If the display apparatus fails to receive external signals when being operated in a TV mode, the display apparatus displays a blue screen, and if there is no change in the external signal during a predetermined time, the display apparatus is automatically turned off.

On the other hand, if the display apparatus fails to receive external signals when being operated in an external device mode with one of the external devices such as VCR, DVD, satellite broadcast receiver, PC, and game console, the display apparatus displays a message that the cable connection condition should be checked.

However, if the display apparatus fails to receive external signals due to environmental factors, the user is required to directly change an input terminal of the display apparatus to an input terminal capable of receiving external signals, which causes inconvenience to the user.

SUMMARY OF THE EXEMPLARY EMBODIMENTS OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a display apparatus which is capable of recognizing an input source even if input signals are detected from the input source late.

Consistent with an aspect of the present invention, there is provided a display apparatus which comprises a signal detector which checks a plurality of input sources in sequence for a predetermined basic time and detects signals input from the plurality of input sources, and a controller which controls the signal detector to adjust the basic time and recheck the plurality of input sources if no signal is detected within the basic time.

The signal detector may check the plurality of input sources in predetermined order.

The controller may apply a predetermined maximum allowable time if no signal is detected within the basic time.

The signal detector may perform the detecting operation a predetermined number of times, and, if no signal is detected for the predetermined number of times, the controller may apply the predetermined maximum allowable time to the last checking phase of each of the plurality of input sources.

The controller may calculate a maximum necessary time which is required until signals are input from each of the plurality of input sources within the maximum allowable time.

The display apparatus may further comprise a storage unit which stores a reference time which is defined considering the maximum necessary time, and the controller may control the signal detector to detect signals by applying the stored reference time to each of the plurality of input sources.

Consistent with an aspect of the present invention, a control method of a display apparatus comprises checking a plurality of input sources in sequence for a predetermined basic time and detecting signals input from the plurality of input sources, and if no signal is detected within the basic time, adjusting the basic time and rechecking the plurality of input sources.

The detecting operation may check the plurality of input sources in a predetermined order.

The rechecking operation may apply a predetermined maximum allowable time if no signal is detected within the basic time.

The detecting operation may be performed a predetermined number of times, and, if no signal is detected for the predetermined number of times, the rechecking operation may apply the predetermined maximum allowable time to the last checking phase of each of the plurality of input sources.

The rechecking operation may calculate a maximum necessary time which is required until signals are input from each of the plurality of input sources within the maximum allowable time.

The control method may further comprise storing a reference time which is defined considering the maximum necessary time, and detecting signals by applying the stored reference time to each of the plurality of input sources.

Accordingly, since the time for detecting input signals from an external input source can be adjusted, an input source from which input signals are detected late can be recognized.

Additional and/or other aspects and advantages of the invention will be set forth in part in the description which follows and, in part, will be obvious from the description, or may be learned by practice of the invention.

BRIEF DESCRIPTION OF THE DRAWING FIGURES

The above and/or other aspects of the present invention will be more apparent by describing certain exemplary embodiments of the present invention with reference to the accompanying drawings, in which:

FIGS. 4A and 4B are views to explain detecting a maximum necessary time consistent with an exemplary embodiment of the present invention.

DETAILED DESCRIPTION OF THE EXEMPLARY EMBODIMENTS

Figure 1:
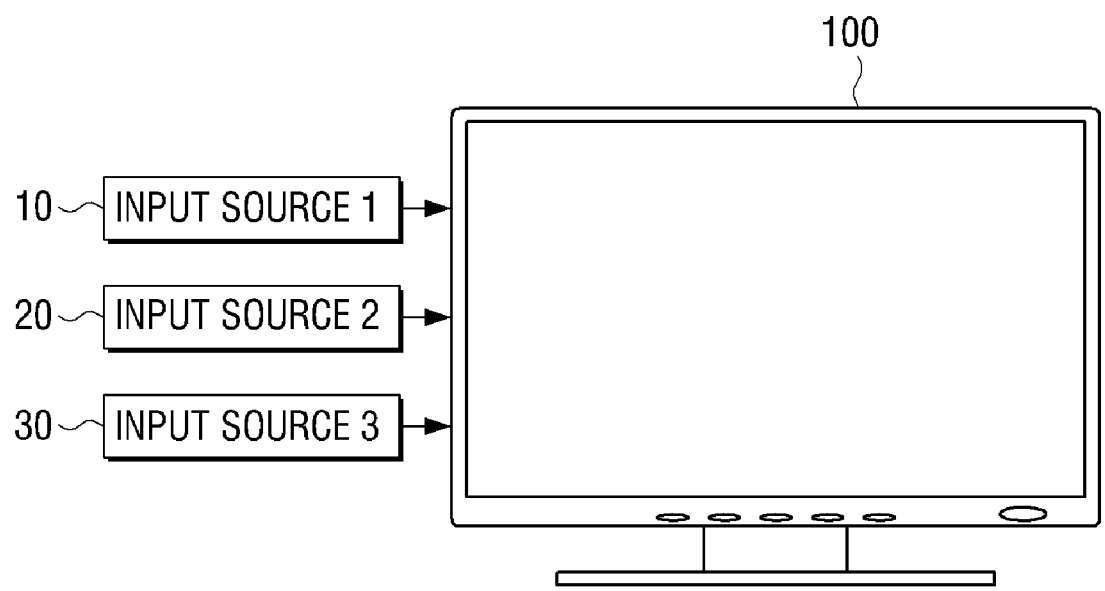
FIG. 1 is a view of a display system consistent with an exemplary embodiment of the present invention.

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

FIG. 1 is a view of a display system according to an exemplary embodiment of the present invention. Referring to FIG. 1, a display system comprises a display apparatus 100 and a plurality of input sources 10, 20, and 30 which transmit input signals to the display apparatus 100.

The display apparatus 100 receives video and audio signals from the plurality of input sources 10, 20, and 30 and displays the signals. The plurality of input sources, recited herein, may be a computer, a digital versatile disc (DVD) player, a video cassette recorder (VCR), or a blue-ray player.

When the display apparatus 100 turns on/off, the display apparatus 100 may fail to receive signals due to environmental factors such as disconnection of the cable from a currently selected input terminal or poor conditions in connection with an external device to a terminal. If signals are not received through a current input terminal, the display apparatus provides a function of selecting another input terminal capable of receiving signals. Hereinafter, this function is referred to as an 'input source conversion mode' for the convenience of explanation.

The input source conversion mode may be an automatic input source conversion mode in which the display apparatus 100 automatically selects an input terminal capable of receiving signals. That is, in the automatic input source conversion mode, depending on whether input signals are received from a selected input source, the display apparatus 100 checks next input sources in sequence, and, if input signals are detected, the input signals are automatically output to the display apparatus 100.

The input source conversion mode may include a manual input source conversion mode in which a user is allowed to select a desired input terminal from the plurality of input terminals through which signals are received.

In the manual input source conversion mode, the display apparatus 100 enables a user to select an input terminal through which signals are received. For example, a list of input terminals through which signals are received is displayed in an on screen display (OSD) method so that the user may select a desired input terminal. However, in the manual input source conversion mode, if there is only one source through which signals are input among the plurality of input sources, the signals are automatically output.

Hereinafter, the automatic input source conversion mode will be mainly described for the convenience of explanation, but it is obvious to an ordinary skilled person in the related art that the following exemplary embodiments are applicable to the manual input source conversion mode.

The automatic input source conversion mode may be switched on/off by the user.

Accordingly, if the automatic input source conversion mode is not selected, the display apparatus 100 displays a no-signal condition. That is, a message such as "No Signal" and "Check Signal Cable" may be displayed or a blanking image may be displayed in order to inform the user that no signal is received through a currently selected input terminal.

Hereinafter, the display apparatus 100 will be described on the assumption that the automatic input source conversion mode is switched on by the user.

Figure 2:
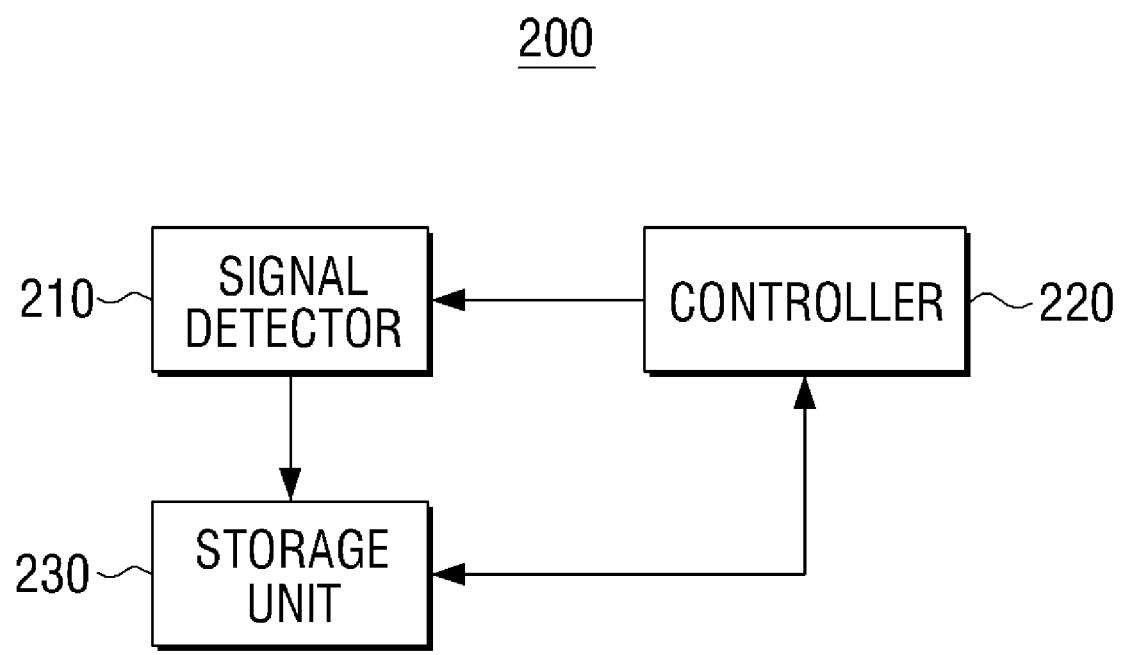
FIG. 2 is a block diagram of a display apparatus consistent with an exemplary embodiment of the present invention.

FIG. 2 is a block diagram of a display apparatus 200 according to an exemplary embodiment of the present invention. Referring to FIG. 2, a display apparatus 200 comprises a signal detector 210, a controller 220, and a storage unit 230.

The signal detector 210 detects signals input from a plurality of input sources. The signal detector 210 checks the plurality of input sources in sequence for a predetermined basic time to detect input signals. In this exemplary embodiment, the basic time is pre-defined but it may be changed by the user according to various circumstances.

The controller 220 controls the signal detector 210 to adjust the predetermined basic time and recheck the plurality of input sources if no signal is detected by the signal detector 210 within the predetermined basic time.

The signal detector 210 checks the plurality of input sources in predetermined order.

For example, if three input sources, input source 1, input source 2, and input source 3, are connected and if the signal detection order is set to the order of input source 1, input source 2, and input source 3, the signal detector 210 checks the input sources in order of "input source 1→input source 2→input source 3→input source 1→input source 2→input source 3 . . . input source 1→input source 2→input source 3". However, this is merely an example and various checking methods such as checking each input source two times and then checking the input sources in sequence or checking the input source at intervals may be used.

The order of checking the input sources is pre-defined in this embodiment, but the order may be changed by the user according to various circumstances. Also, it is possible to check accumulative selection frequency for each input source and change the order of checking input sources according to the accumulative selection frequency. That is, according to the result of checking accumulative frequency of input signals, a priority of each input source is determined from the most frequently used input source to the least frequently used input source.

If no input signal is detected within the predetermined basic time, the controller 220 applies a predetermined maximum allowable time and calculates a maximum necessary time which is required until input signals are input from each input sources.

The signal detector 210 may perform the detecting operations a predetermined number of times, and, if no input signal is detected for the predetermined number of times, the controller 220 applies the predetermined maximum allowable time to the last checking phase of each input source considering the predetermined number of times.

For example, if the number of times that the input signal detecting operations are performed is set to 12, the signal detector 210 checks each input source in sequence four times in order of "input source 1 (basic time applied)→input source 2 (basic time applied)→input source 3 (basic time applied) ... input source 1 (basic time applied)→input source 2 (basic time applied)→input source 3 (basic time applied) →input source 1 (maximum allowable time applied)→input source 2 (maximum allowable time applied)→input source 3 (maximum allowable time applied)", and applies the predetermined maximum allowable time to the fourth checking phase of each input source. However, this is merely an example and the maximum allowable time can be applied to a previous phase as well as the last detecting phase of each input source.

The storage unit 230 stores a reference time that is set considering the maximum necessary time which is required until signals are input from each of the plurality of input sources. The reference time is defined as a time used to detect signals instead of the basic time if the automatic input source conversion mode is applied later.

If the calculated maximum necessary time is shorter than the basic time, the controller 220 determines the basic time as a reference time. Also, if the calculated maximum necessary time is longer than the basic time, the maximum necessary time is determined as a reference time. The above exemplary embodiment will be described below in greater detail with reference the drawings.

If the automatic input source conversion mode is applied after the reference time is stored, the controller 220 controls the signal detector 210 to detect signals by applying the stored reference time to each of the plurality of input sources.

Figure 3:
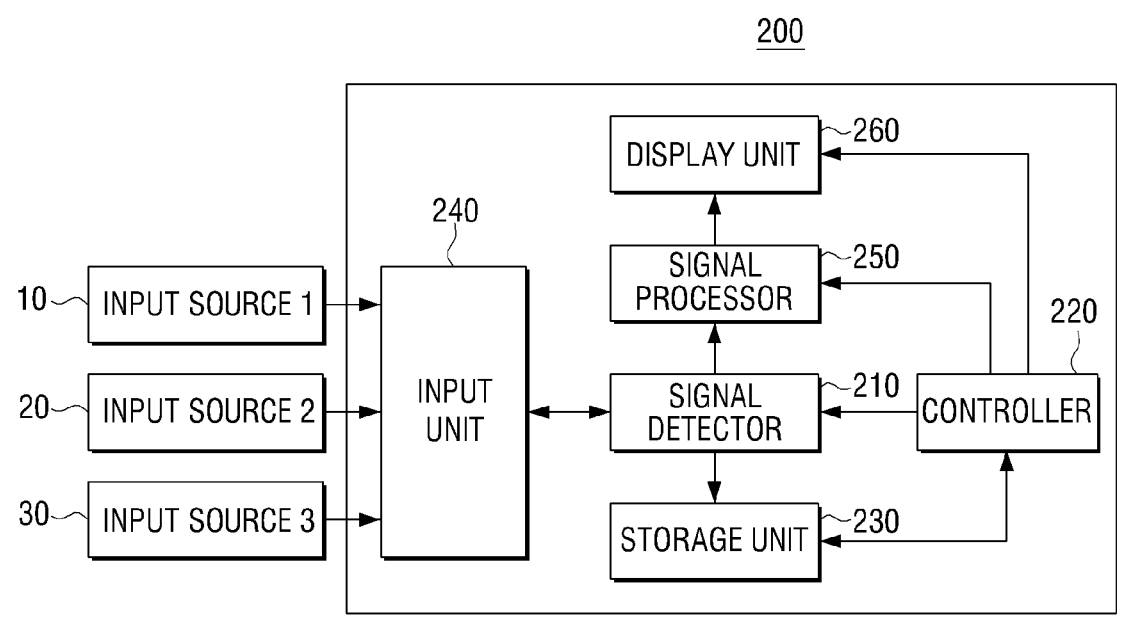
FIG. 3 is a detailed block diagram of the display apparatus of FIG. 2.

FIG. 3 is a detailed block diagram of the display apparatus of FIG. 2. Referring to FIG. 3, the display apparatus 200 comprises the signal detector 210, the controller 220, the storage unit 230, an input unit 240, a signal processor 250, and a display unit 260. Regarding the same components as those illustrated in FIG. 2, detailed description will be omitted.

The signal detector 210 detects input signals input from a plurality of input sources through the input unit 240. The signal detector 210 checks the plurality of input sources for a predetermined basic time in a predetermined order to detect input signals. That is, if no signal is detected from a selected input source, input signals are detected by checking another input source in the predetermined order.

If no input signal is detected from at least one of the plurality of input sources within the predetermined basic time by the signal detector 210, the controller 220 controls the signal detector 210 to adjust the predetermined basic time and recheck the plurality of input sources. If input signals are detected by the signal detector 210 within the predetermined basic time, the controller 220 controls the signal processor 250 and the display unit 260 to process and display the detected signals.

More specifically, if no input signal is detected within the basic time, the controller 220 applies a predetermined maximum allowable time and calculates a maximum necessary time which is required until signals are input from each of the plurality of input sources.

Also, the signal detector 210 performs the detecting operations a predetermined number of times, and if no input signal is detected for the predetermined number of times, the controller 220 applies the predetermined maximum allowable time to the last checking phase of each of the plurality of input sources.

The storage unit 230 stores a reference time which is defined considering the maximum necessary time required until signals are input from each of the plurality of input sources. The storage unit 230 may be realized as an electrically erasable programmable read-only memory (EEPROM) or FLASH ROM to store data.

If the calculated maximum necessary time is shorter than the basic time, the controller 220 determines the basic time as a reference time. Also, if the calculated maximum necessary time is longer than the basic time, the controller 220 determines the maximum necessary time as a reference time.

If the automatic input source conversion mode is applied after the reference time is stored in the storage unit 230, the controller 220 controls the signal detector 210 to detect signals by applying the reference time stored for each of the plurality of input sources.

The input unit 240 receives input signals from the plurality of input sources 10, 20, and 30.

The input unit 240 may be a plurality of ports into which connection cables connected with the input sources are inserted. For example, each port may be a dedicated port for PC analog signals, PC digital signals, TV, VIDEO, S-VIDEO, Component, Digital TV (DTV). Also, the input unit 240 may include a digital signal dedicated port for receiving digital signals and an analog signal dedicated port for receiving analog signals.

The signal processor 250 converts the signals input through the input unit 240 into signals of a format which can be processed by the display unit 260.

The signal processor 250 may include various components for processing signals, such as a decoder to decode composite video broadcast signals or S-Video signals, an A/D converter to convert analog signals of component signals or PC signals into digital signals, and a transition minimized differential signaling (TMDS) receiver to divide DVI-signals into R, G, B digital signals and H/V signals.

Also, the signal processor 250 may include a scalor which scales the converted signals to be suitable for output standards of the display unit 260, such as vertical frequency, resolution, and aspect ratio of the display unit 260.

The display unit 260 displays video signals processed by the signal processor 250 on the screen. The display unit 260 may be of various types such as digital light processing (DLP), liquid crystal display (LCD), or plasma display panel (PDP).

If the signal detector 210 detects signals from at least one input source by applying the predetermined maximum allowable time to the last checking phase of each of the plurality of input sources 10, 20, and 30, the controller 220 causes the detected signals to be displayed on the display unit 260. In this case, the signal detector 210 continues to perform the last checking operation for each input source if the signals have been detected from at least one input source. Also, a message, "In the process of detecting signals", may be displayed on the display unit 260 until the last detecting operation for each of the plurality of input sources 10, 20, and 30 is completed, and the selected input signals may be displayed after all checking operations for each of the input sources are completed.

If a priority is allocated to the plurality of input sources 10, 20 and 30 but if signals are detected from one of the plurality of input sources 10, 20, and 30, the image is displayed according to the priority. However, according to circumstances, at least one of the checked input signals may be arbitrarily selected and displayed.

For example, as a result of applying the maximum allowable time, 10 seconds, to the last checking phase to detect signals since no signal is detected within the basic time, 3 seconds, if signals are detected from input source 2 at 6 seconds and detected from input source 3 at 2 seconds, the storage unit 230 stores the maximum necessary time of input source 2, 6 seconds, as a reference time since the maximum necessary time is longer than the basic time, and stores the basic time of input source 3, 3 seconds, as a reference time since the maximum necessary time, 2 seconds, is shorter than 3 seconds.

Such a stored reference time is substituted for the basic time if the automatic input source conversion mode is applied later. That is, input source 1 is applied with the basic time, 3 seconds, as it is since the maximum necessary time is not detected in input source 1, input source 2 is applied with the maximum necessary time, 6 seconds, as a reference time and input source 3 is applied with the basic time, 3 seconds, as a reference time.

If no signal is detected even within the newly set reference time in the input source conversion mode, the reference time is reset according to the above-described method.

The automatic conversion mode has been mainly described above, but it is obvious to an ordinary skilled person in the related art that the present invention is applicable to a manual conversion mode.

FIGS. 4A and 4B illustrate an example of detecting a maximum necessary time according to an exemplary embodiment of the present invention.

Referring to FIG. 4A, a basic time required for detecting signals from the plurality of input sources, input source 1, input source 2, and input source 3, is set to 3 seconds, and if no signal is detected within the basic time for a predetermined number of times, a maximum allowable time applied to the last checking phase of each input source is set to 10 seconds.

In the above example, in the last checking phase in which 10 seconds are applied as a maximum allowable time, no signal is detected from input source 1, signals are detected from input source 2 at 6 seconds, and signal are detected from input source 3 at 2 seconds.

Referring to FIG. 4B, if the number of times that input sources are checked is set to 12 and the detection is made in order of input sources 1, 2, and 3, the input sources are checked in sequence in the order of "input source 1 ($1^{st}$) →input source 2 ($2^{nd}$)→input source 3 ($3^{rd}$)→input source 1→input source 2→input source 3 . . . input source 1 ($10^{th}$) →input source 2 ($11^{th}$)→input source 3 ($12^{th}$).

If no signal is detected until the $9^{th}$ checking phase, i.e., before the last checking phase of each input source, the maximum allowable time, 10 seconds, is applied to the last checking phases ($10^{th}$ to $12^{th}$) of each of input sources to detect signals.

In the last checking phase of each input source, no signal is detected from input source 1, signals are detected from input source 2 at 6 seconds, and signals are detected from input source 3 at 2 seconds.

In this case, the storage unit 230 stores the basic time (3 seconds) of input source 1, from which no signal is detected in the last phase, as a reference time for input source 1, stores the maximum necessary time (6 seconds) of input source 2, which is longer than the basic time (3 second), as a reference time for input source 2, and stores the basic time (3 seconds) of input source 3, the maximum necessary time (2 seconds) of which is shorter than the basic time (3 seconds), as a reference time for input source 3.

Such a stored reference time is substituted for the basic time for detecting signals if the input source conversion mode is applied later.

In this exemplary embodiment, the automatic input source conversion mode has been mainly described, but the present invention is applicable to the manual input source conversion mode.

Figure 5:
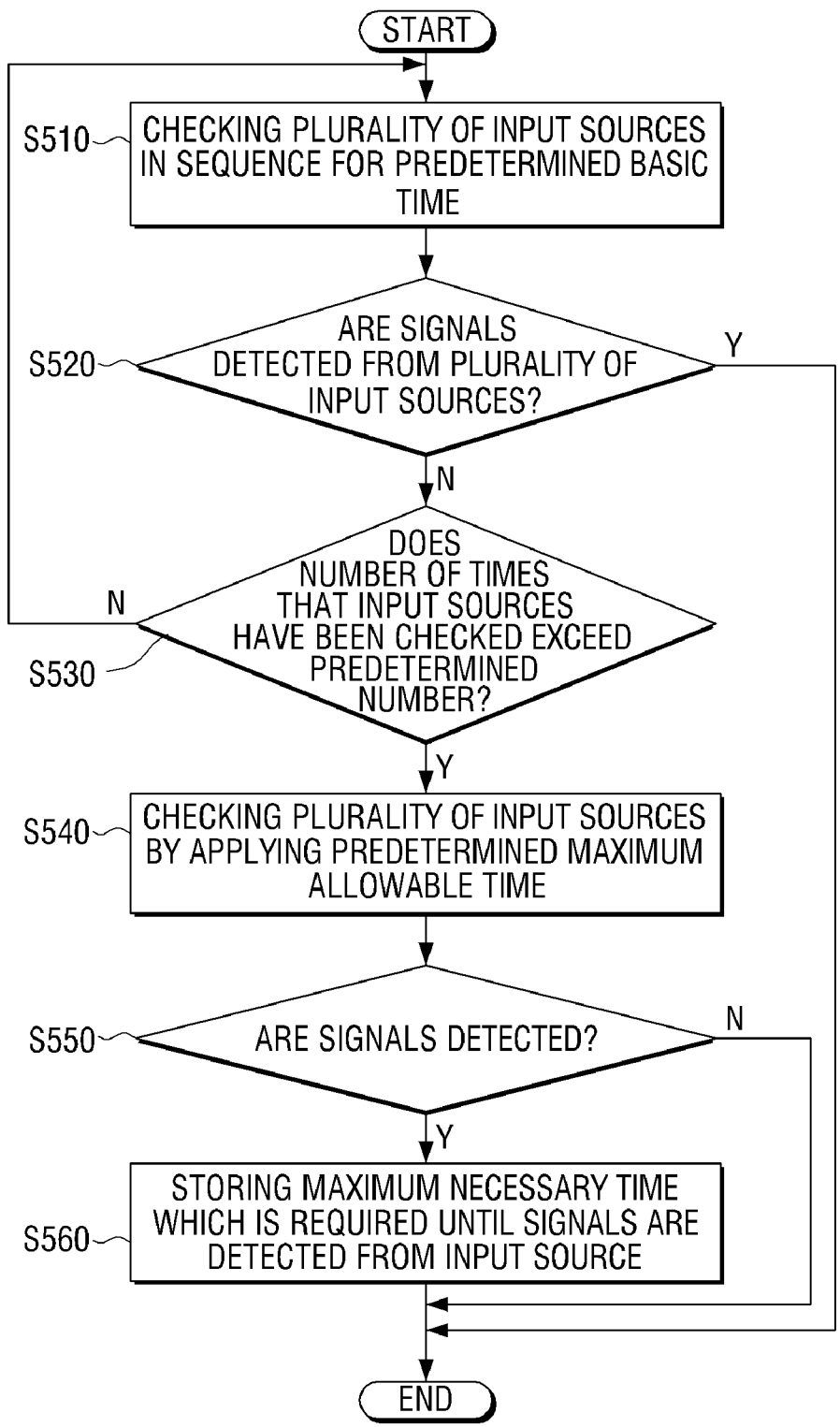
FIG. 5 is a flowchart outlining a control method of a display apparatus consistent with an exemplary embodiment of the present invention.

FIG. 5 is a flowchart outlining a control method of a display apparatus according to an exemplary embodiment of the present invention.

Referring to FIG. 5, a plurality of input sources is checked in sequence for a predetermined basic time (operation S510). In this operation, the input sources may be checked in a predetermined order a predetermined number of times. For example, if the basic time is set to 3 seconds, the detection is made in order of input sources 1, 2, and 3, and the number of times that the detecting operation is performed is set to 12, the input sources are checked in order of "input source 1→input source 2→input source 3→input source 1→input source 2→input source 3 . . . input source 1→input source 2→input source 3".

Next, it is checked whether signals are detected from the plurality of input sources (operation S520)

If no signal is detected from the plurality of input sources within the basic time (operation S520: N), it is checked whether the number of times that the input sources have been checked exceeds a predetermined number or not (operation S530).

If the number of times that the input sources have been checked exceeds a predetermined number (operation S530: Y), the plurality of input sources are checked by applying a predetermined maximum allowable time (operation S540).

For example, if the total number of times that the detecting operation is performed is set to 12 and if the number of times that the input sources have been checked exceeds 10, the plurality of input sources are checked by applying the maximum allowable time, for example, 10 seconds from the $10^{th}$ checking phase.

If signals are detected within the predetermined maximum allowable time (operation S550: Y), a maximum necessary time which is required until signals are input from each of the input sources is stored (operation S560). That is, if signals are detected from input source 2 at 6 seconds as a result of applying the maximum allowable time, 10 seconds, to the last checking phase of each of the input sources, the maximum necessary time, 6 seconds, is stored for input source 2.

A reference time which is defined considering the maximum necessary time which is required until signals are input from each of the plurality of input sources may be stored. More specifically, if the calculated maximum necessary time is shorter than the basic time, the basic time is set as a reference time, and if the calculated maximum necessary time is longer than the basic time, the maximum necessary time is set as a reference time.

For example, as a result of applying the maximum allowable time, 10 seconds, to the last phase since no signal is detected within the basic time, 3 seconds, if signals are detected from input source 2 at 6 seconds and signals are detected from input source 3 at 2 seconds, the storage unit 230 stores the maximum necessary time, 6 seconds, as a reference time for input terminal 2 because the maximum necessary time is longer than the basic time, 3 seconds, and stores the basic time, 3 seconds, as a reference time for input terminal 3 because the maximum necessary time, 2 seconds, is shorter than the basic time.

Such a stored reference time is substituted for the basic time if the input source conversion mode is applied later. That is, the basic time, 3 seconds, is applied to input source 1 since no maximum necessary time is detected in input source 1, the maximum necessary time, 6 seconds, is applied to input source 2 since the maximum necessary time is longer than the basic time, 3 seconds, and the basic time, 3 seconds, is applied to input source 3 since the maximum necessary time, 2 seconds, is shorter than the basic time.

Since the time for detecting input signals from an external input source can be adjusted, an input source from which input signals are detected late can be recognized.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A display apparatus comprising:
    a signal detector which checks a plurality of input sources in sequence for a predetermined basic time and detects signals input from the plurality of input sources; and
    a controller which controls the signal detector to adjust the basic time and recheck the plurality of input sources if no signal is detected within the basic time,
    wherein the signal detector performs the detecting operation a predetermined number of times, and
    wherein, if no signal is detected for the predetermined number of times, the controller applies the predetermined maximum allowable time to a last checking phase of each of the plurality of input sources.

2. The display apparatus as claimed in claim 1, wherein the signal detector checks the plurality of input sources in a predetermined order.

3. The display apparatus as claimed in claim 1, wherein the controller applies the predetermined maximum allowable time if no signal is detected within the basic time.

4. The display apparatus as claimed in claim 3, wherein the controller calculates a maximum necessary time which is required until signals are input from each of the plurality of input sources within the maximum allowable time.

5. The display apparatus as claimed in claim 4, further comprising a storage unit which stores a reference time which is defined considering the maximum necessary time,
    wherein the controller controls the signal detector to detect signals by applying the stored reference time to each of the plurality of input sources.

6. A control method of a display apparatus, the method comprising:
    checking a plurality of input sources in sequence for a predetermined basic time and detecting signals input from the plurality of input sources; and
    if no signal is detected within the basic time, adjusting the basic time and rechecking the plurality of input sources,
    wherein the detecting operation is performed a predetermined number of times,
    wherein, if no signal is detected for the predetermined number of times, the rechecking operation applies the predetermined maximum allowable time to a last checking phase of each of the plurality of input sources.

7. The control method as claimed in claim 6, wherein the detecting operation checks the plurality of input sources in a predetermined order.

8. The control method as claimed in claim 6, wherein the rechecking operation applies the predetermined maximum allowable time if no signal is detected within the basic time.

9. The control method as claimed in claim 8, wherein the rechecking operation calculates a maximum necessary time which is required until signals are input from each of the plurality of input sources within the maximum allowable time.

10. The control method as claimed in claim 9, further comprising:
    storing a reference time which is defined considering the maximum necessary time; and
    detecting signals by applying the stored reference time to each of the plurality of input sources.

11. A display apparatus comprising:
    a signal detector which checks a plurality of input sources in sequence for a predetermined basic time and detects signals input from the plurality of input sources; and
    a controller which controls the signal detector to adjust the basic time and recheck the plurality of input sources if no signal is detected within the basic time,
    wherein the predetermined basic time is a continuous time period for detecting signals, and is set differently according to a type of the plurality of input sources,
    wherein the detecting operation is performed a predetermined number of times, and
    wherein, if no signal is detected for the predetermined number of times, the rechecking operation applies the predetermined maximum allowable time to a last checking phase of each of the plurality of input sources.

12. The display apparatus as claimed in claim 11, wherein the signal detector checks the plurality of input sources in a predetermined order.

13. The display apparatus as claimed in claim 11, wherein the controller applies a predetermined maximum allowable time if no signal is detected within the basic time.

14. The display apparatus as claimed in claim 13, wherein the controller calculates a maximum necessary time which is required until signals are input from each of the plurality of input sources within the maximum allowable time.

15. The display apparatus as claimed in claim 14, further comprising a storage unit which stores a reference time which is defined considering the maximum necessary time,
    wherein the controller controls the signal detector to detect signals by applying the stored reference time to each of the plurality of input sources.

16. A control method of a display apparatus, the method comprising:
    checking a plurality of input sources in sequence for a predetermined basic time and detecting signals input from the plurality of input sources; and
    if no signal is detected within the basic time, adjusting the basic time and rechecking the plurality of input sources,
    wherein the predetermined basic time is a continuous time period for detecting signals, and is set differently according to a type of the plurality of input sources,
    wherein the detecting operation is performed a predetermined number of times, and
    wherein, if no signal is detected for the predetermined number of times, the rechecking operation applies the predetermined maximum allowable time to a last checking phase of each of the plurality of input sources.

17. The control method as claimed in claim 16, wherein the rechecking operation applies a predetermined maximum allowable time if no signal is detected within the basic time.

18. The control method as claimed in claim 16, wherein the detecting operation checks the plurality of input sources in a predetermined order.

19. The control method as claimed in claim 18, wherein the rechecking operation calculates a maximum necessary time which is required until signals are input from each of the plurality of input sources within the maximum allowable time.

20. The control method as claimed in claim 19, further comprising:
    storing a reference time which is defined considering the maximum necessary time; and
    detecting signals by applying the stored reference time to each of the plurality of input sources.

* * * * *